United States Patent [19]

Ohori et al.

[11] 4,352,128
[45] Sep. 28, 1982

[54] COMBINATION ELECTROSTATIC COPYING MACHINE AND FACSIMILE TRANSCEIVER

[75] Inventors: Tamio Ohori; Fuyuhiko Mastumoto; Satoru Tomita, all of Tokyo, Japan

[73] Assignee: Ricoh Company, Ltd., Tokyo, Japan

[21] Appl. No.: 923,295

[22] Filed: Jul. 10, 1978

[30] Foreign Application Priority Data

Jul. 14, 1977 [JP] Japan .................................. 52-84461

[51] Int. Cl.$^3$ ........................ H04N 1/18; H04N 1/22
[52] U.S. Cl. .................................. 358/294; 358/293; 358/296
[58] Field of Search ............... 358/256, 258, 285, 286, 358/293, 294, 212, 213, 296; 346/154, 155

[56] References Cited

U.S. PATENT DOCUMENTS

| | | | |
|---|---|---|---|
| 3,662,396 | 5/1972 | Brown, Jr. | 346/154 |
| 3,943,525 | 3/1976 | Skala | 346/1 |
| 3,947,627 | 3/1976 | Tanaka | 358/294 |
| 4,013,832 | 3/1977 | Douglas | 358/212 |
| 4,117,518 | 9/1978 | Skala | 358/285 |
| 4,122,352 | 10/1978 | Crean et al. | 235/454 |

OTHER PUBLICATIONS

Ikeuchi et al.-Electrographic Recording Using New Electronic Scanning System-Toshiba Review, No. 104, pp. 36-40, Jul.-Aug. 1976.

Primary Examiner—Joseph A. Orsino, Jr.
Attorney, Agent, or Firm—David G. Alexander

[57] ABSTRACT

A horizontal portion of an original document is scanned by means of N linear photosensor arrays arranged in a row. Each array has M photosensor elements. M strobe pulses are sequentially applied to the M photosensor elements of all of the arrays in parallel, the photosensor elements producing output signals in response to the respective strobe pulses. The output signals of the N photosensor arrays are applied in parallel to N printing electrode arrays for simultaneous printing, thus enabling high speed copying. The photosensor arrays are adapted to be strobed in sequence for facsimile transmission. A storage means is adapted to receive M·N facsimile input signals, divide the signals into N groups of M signals each and simultaneously feed the signal groups to the respective electrode arrays, the M individual signals of each group being fed to the respective electrode array serially. Alternatively, the groups of signals may be fed to the respective electrode groups sequentially rather than simultaneously.

8 Claims, 6 Drawing Figures

COMBINATION ELECTROSTATIC COPYING MACHINE AND FACSIMILE TRANSCEIVER

BACKGROUND OF THE INVENTION

The present invention relates to a high speed combination electrostatic copying machine and facsimile transceiver.

Copying machines known in the art utilize light, static electricity, heat, magnetism, etc. to directly copy an original document onto a reproduction medium such as a sheet of paper. Such copying machines cannot be readily adapted to bifunction as facsimile transceivers.

Further known in the art is an electrostatic copying machine comprising a linear photosensor array. The individual photosensor elements of the array are strobed in sequence to produce output signals and thereby scan an original document in the horizontal direction. Vertical scan is effected by means of physical movement of the document. The output signals of the photosensor array are fed to a linear array of electrostatic recording electrodes which are energized in accordance with the signals to apply an electrostatic charge pattern to a sheet of copy paper. A toner substance is applied to the paper to develop the electrostatic pattern into a visible image.

This type of copying machine tends to be slow in operation since each horizontal scan line must be scanned and printed before the next line can be scanned. Since the recording electrodes must be energized for a certain length of time to produce an electrostatic charge pattern, the operating speed of such a prior art copying machine cannot be increased beyond a corresponding value without sacrificing resolution.

An expedient which may be employed to increase the copying speed in such a machine is to reduce the number of photosensor elements in the array (and thereby reduce the horizontal scan density) and/or reduce the number of horizontal scan lines per unit vertical distance (and thereby the vertical scan density). However, such reduction of the scan density tends to degrade the copy resolution to a unacceptable extent in actual application. For this reason, it has heretofore been impossible to provide both acceptably high resolution and copying speed in such a copying machine.

SUMMARY OF THE INVENTION

In accordance with the present invention an optoelectronic sensor means is provided for scanning a linear portion of an original document. The sensor means comprises N linear photosensor arrays arranged in a row, each photosensor array comprising M photosensor elements, N and M being integers. A strobe means sequentially applies M strobe pulses to the M photosensor elements respectively of all of the photosensor arrays, the photosensor elements producing output signals in response to the respective stroke pulses. Printing means receive the output signals of all of the photosensor arrays and form marks on a reproduction medium corresponding thereto. The output signals of the photosensor arrays may be fed to a remote receiver for facsimile transmission. Input signals from a remote transmitter may be applied to the printing means for facsimile reception.

It is an object of the present invention to provide a novel and unique combination electrostatic copying machine and facsimile transceiver.

It is another object of the present invention to provide a reproduction apparatus which bifunctions as an electrostatic copying machine and facsimile transceiver.

It is another object of the present invention to substantially increase the reproduction speed in an electrostatic copying machine or facsimile apparatus while maintaining high resolution.

It is another object of the present invention to provide a generally improved reproduction apparatus.

Other objects, together with the foregoing, are attained in the embodiments described in the following description and illustrated in the accompanying drawing.

DESCRIPTION OF THE PREFERRED EMBODIMENTS

While the reproduction apparatus of the invention is susceptible of numerous physical embodiments, depending upon the environment and requirements of use, substantial numbers of the herein shown and described embodiment have been made, tested and used, and all have performed in an eminently satisfactory manner.

Figure 1:
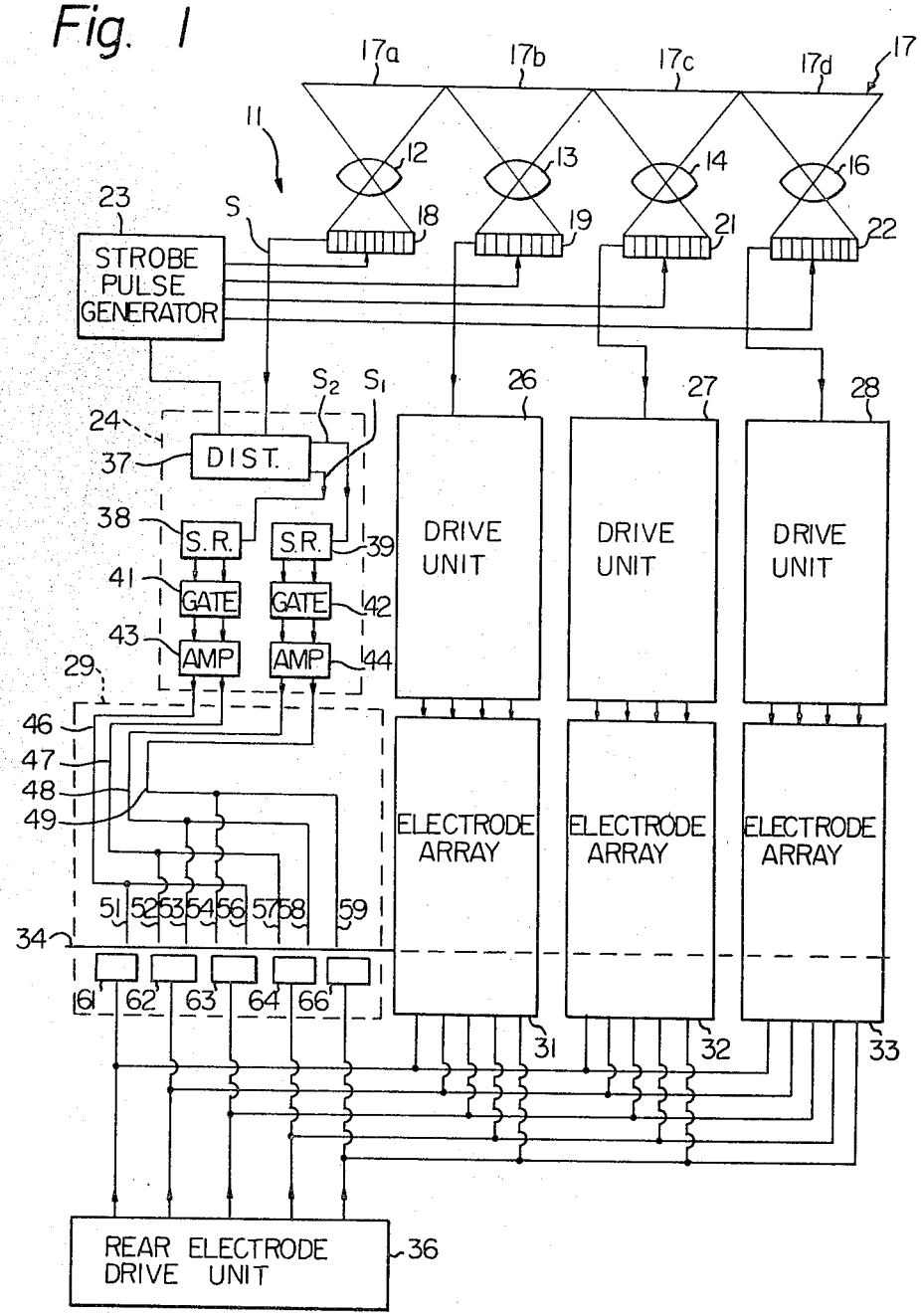
FIG. 1 is a block diagram of an electrostatic copying embodying the present invention.

Referring now to FIG. 1 of the drawing, a reproduction apparatus embodying the present invention is generally designated by the reference numeral 11 and comprises four optical systems which are symbolically illustrated as being in the form of converging lenses 12, 13, 14 and 16. The lenses 12, 13, 14 and 16 focus light images of a linear portion of an original document 17 onto four photosensor arrays 18, 19, 21 and 22 respectively. The individual portions of the document 17 which are imaged by the lenses 12, 13, 14 and 16 are designated as 17a, 17b, 17c and 17d respectively.

In the simplified exemplary embodiment shown in FIG. 1, each photosensor array 18, 19, 21 and 22 comprises 8 individual photosensor elements in a linear arrangement, although not designated by reference numerals. The arrays 18, 19 21 and 22 are arranged in a row such that all of the photosensor elements of all of the arrays 18, 19, 21 and 22 lie on a line.

The arrays 18, 19, 21 and 22 are typically charge-coupled devices (CCD) and are provided with internal circuitry whereby the photosensor elements sequentially produce output signals corresponding to incident light intensity in response to strobe pulses from a strobe pulse generator 23. However, the arrays 18, 19, 21 and 22 have separate strobe inputs and can be strobed individually.

The present apparatus 11 comprises N photosensor arrays each having M photosensor elements, M and N being integers. In the illustrated embodiment B=4 and M=8. Thus, there are a total of 32 individual photosensor elements and the linear portion of the light image of the document 17 is divided into 32 discrete portions. The document 17 is scanned in the horizontal direction by means of strobing the photosensor elements. Vertical scan is accomplished by means not shown which feed the document 17 by one increment in the vertical direction each time a horizontal scan is performed.

For electrostatic copying, the strobe pulse generator 23 applies 8 strobe pulses to the array 18, 19, 21 and 22 in parallel. In response to the 8 strobe pulses, the photosensor elements of the arrays 18, 19, 21 and 22 sequentially produce output signals corresponding to incident light. Photosensor elements in corresponding positions in the arrays 18, 19, 21 and 22 produce output signals simultaneously. For example, in response to the fourth strobe pulse, the arrays 18, 19, 21 and 22 produce simultaneous output signals corresponding to incident light intensity sensed by the fourth photosensor elements thereof respectively.

In response to the M strobe pulses the arrays 18, 19, 21 and 22 serially produce M output signals each which are applied to drive units 24, 26, 27 and 28 respectively. The drive units 24, 26, 27 and 28 energize printing electrode arrays 29, 31, 32 and 33 respectively which form an electrostatic charge pattern on a reproduction medium 34 corresponding to the output signals. A rear electrode drive unit 36 feeds signals to the electrode arrays 29, 31, 32 and 33 in a manner which will be described in detail below.

Each electrode array 29, 31, 32 and 33 comprises M printing electrodes arranged in a linear configuration. It will be recalled that in this case M=8. Thus, there are just as many printing electrodes as there are photosensor elements.

Voltages applied to the electrode arrays 29, 31, 32 and 33 from the drive units 24, 26, 27 and 28 and rear electrode drive unit 36 form an electrostatic charge pattern on the reproduction medium 34. Depending on the type of application, after the entire document 17 is scanned and a complete electrostatic image formed on the medium 34, a toner substance may be applied to the medium 34 to develop the electrostatic image into a toner image which is subsequently fixed to the medium 34 to provide a permanent copy of the document 17. Alternatively, the electrostatic image may be transferred from the medium 34 to another medium such as a sheet of copy paper and the transferred electrostatic image developed to provide the copy.

The detailed construction of the drive unit 24 and electrode array 29 is illustrated in detail in FIG. 1. The drive units 26, 27 and 28 are identical to the drive unit 24 and the electrode arrays 31, 32 and 33 are identical to the array 29. Thus, they are not shown in detail and will not be described repetitiously.

The drive unit 24 comprises a data distributor 37 which feeds groups of output signals from the array 18 to serial-to-parallel converters here shown as being in the form of serial-in, parallel-out shift registers 38 and 39. In this example, R converters are provided, each having S parallel outputs, where R=2 and S=2. The parallel outputs of the shift registers 38 and 39 are connected through gates 41 and 42 and high voltage amplifiers 43 and 44 to bus lines 46, 47, 48 and 49. The number of bus lines is therefore R×S.

Each bus line 46, 47, 48 and 49 is connected to P printing electrodes. In this case P=2. The bus lines 46, 47, 48 and 49 are connected to printing electrodes 51, 52, 53 and 54 respectively which are arranged in consecutive order in a row. The bus lines 46, 47, 48 and 49 are also connected to printing electrodes 56, 57, 58 and 59 respectively which are arranged in consecutive order in the same row as the electrodes 51, 52, 53 and 54. Although the printing electrodes of the electrode arrays 31, 32 and 33 are not illustrated in the drawing, they are arranged in the same row as the electrodes of the array 20 in a consecutive manner. Thus, printing electrodes form a continuous line.

It will be noted that the number of printing electrodes in each array, which is equal to M, is also equal to the product of the number of serial-to-parallel converter (R), the number of parallel output of each converter (S) and the number of electrodes connected to each parallel output (P). Thus, M(8)=R(2)×S(2)×P(2), where R, S and P must necessarily be integers. The parameters P is also the cycle number of the drive unit 24 as will become clear from further description.

Figure 2:
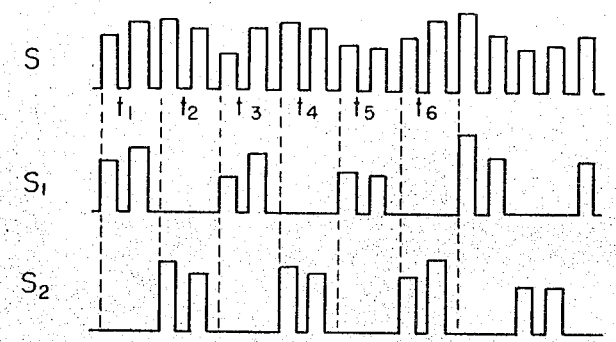
FIG. 2 is a timing diagram of the copying machine of FIG. 1.

In operation, the data distributor 37, in synchronism with the strobe pulses, functions to alternatingly feed groups of two output signals each from the photosensor array 18 to the shift registers 38 and 39. As illustrated in FIG. 2, the output signals of the array 18 are designated as S. The signals fed from the data distributor 37 to the shift register 38 are designated as S1 and those fed to the shift register 39 are designated as S2. Thus, output signals are fed into the shift register 38 during time periods t1, t3, t5 . . . and into the shift register 39 during time periods t2, t4, t6 . . .

The gates 41 and 42 function to disconnect the outputs of the shift registers 38 and 39 from the amplifiers 43 and 44 while the signals S1 and S2 are being shifted into the shift registers 38 and 39 respectively.

Assuming that signals S2 are being shifted into the shift register 39 during the time t2, the output signals from the shift register 38 are fed in parallel through the gate 41 and amplifier 43 to the bus lines 46 and 47. The amplifiers 43 and 44 are designated to produce a voltage of, for example, −300 VDC in response to a logically high output signal from the shift register 38 and 39 respectively (corresponding to a dark image area of the document 17) and 0 VDC in response to a logically low output. Assuming that the signal on the bus line 46 is −300 VDC and the signal on the bus line 47 is 0 VDC, a signal of −300 VDC will be applied to the electrodes 51 and 56 and a signal of 0 VDC will be applied to the electrodes 52 and 57.

Further illustrated in FIG. 1 are rear electrodes 61, 62, 63, 64 and 66 which are energized in a generally consecutive manner by the drive unit 36. The medium 34 is disposed between the printing electrodes and rear electrodes. During the time period t2, a voltage of +300 VDC is applied to the electrodes 61 and 62 and 0 VDC is applied to the electrodes 63, 64 and 66.

Since it was assumed for purpose of example that −300 VDC is being applied to the electrode 51 and 0 VDC to the electrode 52, an electrostatic charge point will be formed on the medium 34 between the electrodes 51 and 61 due to the potential difference of +300 VDC−(−300 VDC)=|600 VDC|. This charge point will appear in the finished copy as a black point since toner will adhere to the charge point. However, no charge point will be formed between the electrodes 52 and 62 since the potential difference is only +300 VDC.

Likewise, although a voltage of −300 VDC is applied to the electrode 56, no charge point will be formed on the medium 34 since the voltage on the adjacent rear electrode 63 is 0 VDC.

During the time period t3 signals S1 are fed into the shift register 38 and the signals shifted into the shift register 39 are applied to the bus lines 48 and 49 through the gate 42 and amplifier 44. During the time period t3, the rear electrodes 62 and 63 are energized. A charge pattern is formed on the medium 34 corresponding to the signals applied to the electrodes 53 and 54 through the bus lines 48 and 49.

During the time period t4 the rear electrodes 63 and 64 are energized and the signals from the shift register 38 applied to the electrodes 56 and 57 for printing. During the time period t5 the rear electrodes 64 and 66 are energized and the signals from the shift register 39 applied to the electrodes 58 and 59.

It will be noted that P groups of S signals are applied to each of the shift registers 38 and 39 for scanning and printing one line in an alternating manner. Thus, the parameter P corresponds to the number of cycles, or groups of signals, which are applied to each shift register or serial-to-parallel converter for each scan line.

The major speed advantage provided by the present invention will become readily apparent through comparison of the operation of the present invention will the prior art. In a prior art electrostatic copying machine comprising a single photosensor array having the same total number of photosensor elements as the present apparatus 11 (in this case 32), one line would be scanned and printed in response to 32 strobe pulses. This is because the photosensor elements in the prior art are sequentially strobed individually. However, in accordance with the present invention, an entire line is scanned and printed in response to only 8 strobe pulses. Thus, the present apparatus 11 is N=4 times faster in operation than a comparable prior art apparatus. It is also clear that each line may be scanned and printed in 1/N=¼ the time required by a prior art apparatus.

Although M=8 and N=4 in the present example, M and N will have much higher values in actual application. The values of R, S and P are similarly not limited within the scope of the present invention. In addition, the arrays 18, 19, 21 and 22 may be combined in a single monolithic structure in accordance with the present invention. However, it is required that each section of the monolithic array corresponding to the individual arrays 18, 19, 21 and 22 be capable of being strobed individually.

Figure 5:
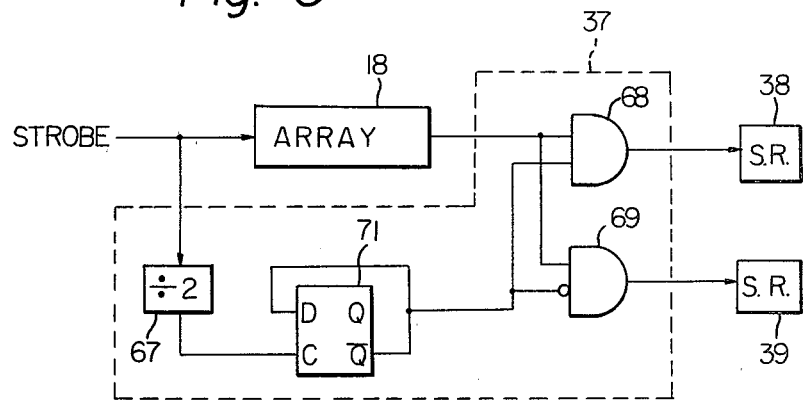
FIG. 5 is a schematic diagram of a data distributor of the copying machine of FIG. 1.

An example of the data distributor 37 is shown in FIG. 5 as comprising a frequency divider 67 which divides the frequency of the strobe pulses by a factor of two. The output of the array 18 is connected to inputs of AND gates 68 and 69, the outputs of which are connected to the serial inputs of the shift registers 38 and 39 respectively. The output of the frequency divider 67 is connected to the clock input of a D-type flip-flop 71. The $\bar{Q}$ output of the flip-flop 71 is connected to the D input thereof to cause the flip-flop 71 to toggle in response to high outputs from the frequency divider 67. The $\bar{Q}$ output of the flip-flop 71 is also connected to a non-inverting input of the AND gate 68 and to an inverting input of the AND gate 69.

In operation, the flip-flop 71 is initially reset so that the high $\bar{Q}$ output thereof enables the AND gate 68 and inhibits the AND gate 69. This allows the first two output signals from the array 18 to be gated through the AND gate 68 to the shift register 38.

The second strobe pulse appears at the output of the frequency divider 67 and toggles the flip-flop 71 so that the $\bar{Q}$ output thereof goes low. This enables the AND gate 69 and inhibits the AND gate 68, thereby allowing the third and fourth output signals from the array 18 to be gated through the AND gate 69. The flip-flop 71 is again toggled by the fourth strobe pulse, and the process repeated.

Figure 3:
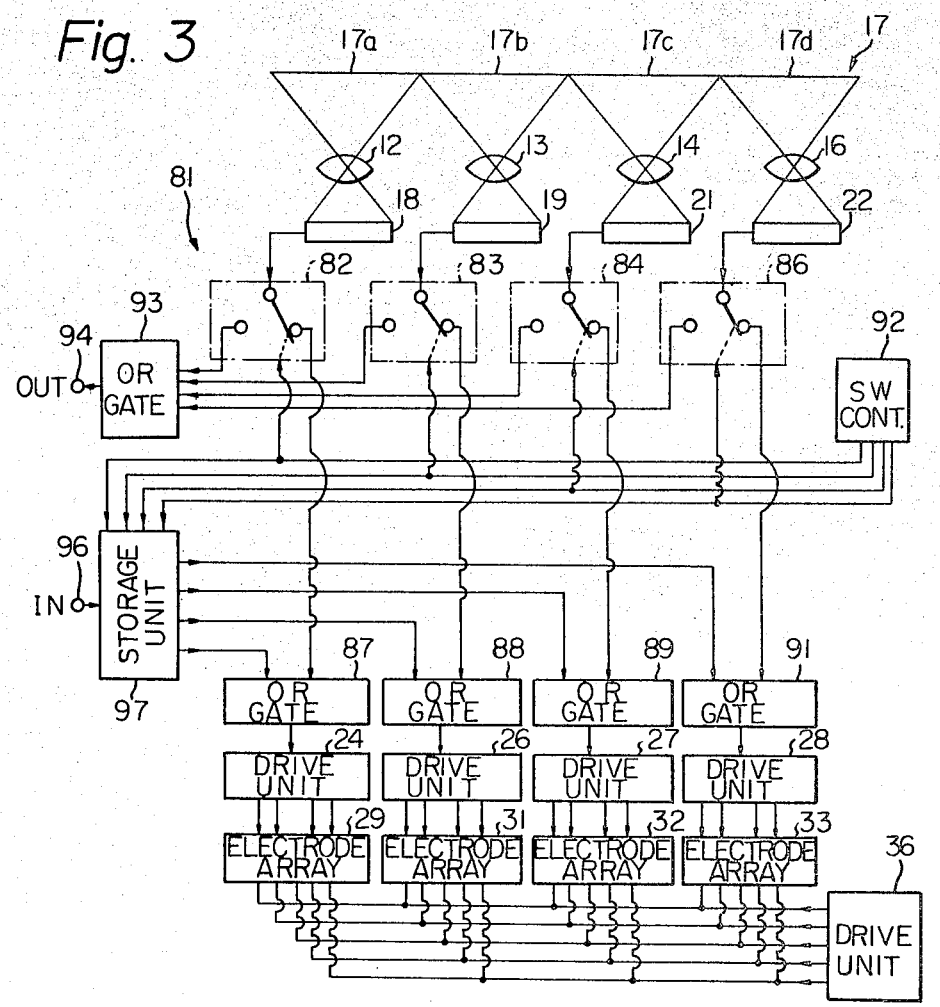
FIG. 3 is a block diagram showing the copying machine of FIG. 1 adapted to bifunction as a facsimile transceiver.

FIG. 3 shows the present apparatus 11, here designated as 81, adapted to bifunction as a facsimile transceiver. Like elements are designated by the same reference numerals used in FIG. 1.

The apparatus 81 comprises switches 82, 83, 84 and 86 connected between the arrays 18, 19, 21 and 22 and drive units 24, 26, 27 and 28 respectively. OR gates 87, 88, 89 and 91 are connected between the switches 82, 83, 84 and 86 and the drive units 24, 26, 27 and 28 respectively. The switches 82, 83, 84 and 86 are controlled by a switch control unit 92 to selectively connect the outputs of the arrays 18, 19, 21 and 22 to inputs of the OR gates 87, 88, 89 and 91 respectively or to inputs of an OR gate 93. The output of the OR gate 93 constitutes an output terminal 94.

To operate the apparatus 81 as a copying machine, the switches 82, 83, 84 and 86 are all changed over to the illustrated position by the switch control unit 92 to connect the outputs of the arrays 18, 19, 21 and 22 to the drive units 24, 26, 27 and 28 through the OR gates 87, 88, 89 and 91 respectively. The operation is otherwise the same as described above.

To operate the apparatus 81 as a facsimile transmitter, the strobe pulse generator 23 (not shown in FIG. 3) is adapted to generate, rather than a single group of M strobe pulses, N groups of M strobe pulses each. The switches 82, 83, 84 and 86 are sequentially changed over to connect the respective array 18, 19, 21 and 22 to the inputs of the OR gate 93.

More specifically, the switch 82 is first changed over to connect the array 18 to the OR gate 93. It will be noted that the gates 41 and 42 in the drive unit 24 are closed to prevent printing during this operation. Thus, during the first M strobe pulses, the output signals of the array 18 are fed through the switch 82 and OR gate 93 to the output terminal 94 for transmission to a remote transceiver (not shown). Then, the switch 82 is returned to the illustrated position and the switch 83 changed over to connect the array 19 to the OR gate 93. During the second group of M strobe pulses the output signals of the array 19 are fed to the output terminal 94 for transmission. In an essentially similar manner the switches 84 and 86 are sequentially changed over to feed the output signals from the arrays 21 and 22 to the output terminal 94 during the third and fourth groups of M strobe pulses respectively.

As a result of the operation of the apparatus 81 in the facsimile transmission mode, the parallel output signals of the arrays 18, 19, 21 and 22 are converted into serial form to correspond to the normal facsimile transmission format. In other words, the outputs signals from the arrays 18, 19, 21 and 22 are strung together in time.

For facsimile reception, the switches 82, 83, 84 and 86 are all changed over to disconnect the arrays 18, 19, 21 and 22 from the OR gates 87, 88, 89 and 91 respectively. Then, N groups of M facsimile input signals from a remote transmitter (not shown) are sequentially fed through an input terminal 96 into a storage unit 97 which has N outputs connected to respective inputs of the OR gates 87, 88, 89 ad 91.

Figure 6:
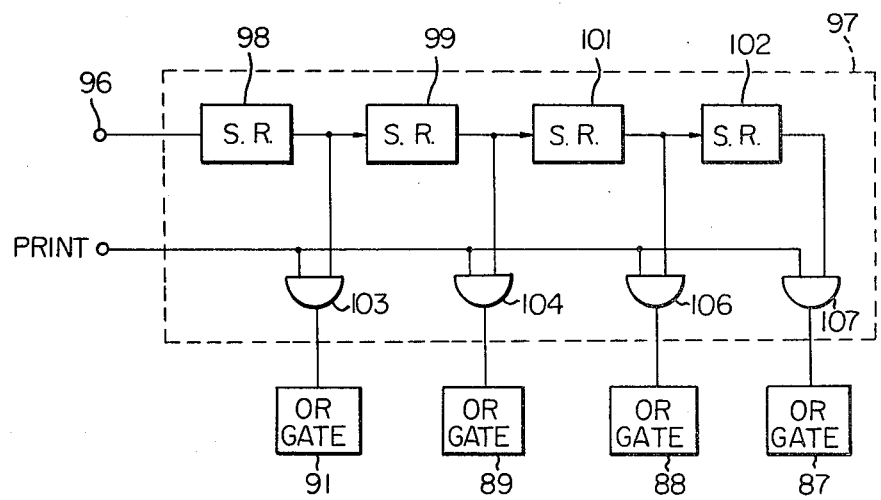
FIG. 6 is a schematic diagram of a storage means of the copying machine of FIG. 1.

As illustrated in FIG. 6, the storage unit 97 comprises N shift registers each having a capacity of M bits. The four shift registers are designated as 98, 99, 101 and 102 respectively. The output of the shift register 98 is connected to the serial input of the shift register 99 and also to an input of an AND gate 103. The output of the shift register 99 is connected to the serial input of the shift register 101 and also to an input of an AND gate 104. The output of the shift register 101 is connected to the serial input of the shift register 102 and also to an input of an AND gate 106. The output of the shift register 102 is connected to an input of an AND gate 107. The outputs of the AND gates 103, 104, 106 and 107 are connected to inputs of the OR gates 91, 89, 88 and 87 respectively. The serial input of the shit register 98 is connected to the input terminal 96. A print signal from a central control unit (not shown) is adapted to be applied to inputs of the AND gates 103, 104, 106 and 107 respectively. The shift registers 98, 99, 101 and 102 are of the serial-in, serial-out type.

Initially, the print signal is low inhibiting the AND gates 103, 104, 106 and 107. The N groups of M input signals each are serially fed into the shift registers 98, 99, 101 and 102 through the input terminal 96 in synchronism with clock pulses from a suitable clock pulse generator (not shown).

The first, second, third and fourth groups of M input signals are stored in the shift registers 102, 101, 99 and 98 respectively due to the flow-through arrangement of the shift registers. Then, the print signal is made high enabling the AND gates 103, 104, 106 and 107. Then, M clock pulses are applied to the shift registers 98, 99, 101 and 102 to shift out the stored signals through the OR gates 91, 89, 88 and 87 to the drive units 28, 27, 26 and 24 respectively. The printing operation is otherwise the same as for electrostatic copying, and is performed at the same high speed. Although the signals are also shifted through the shift registers 98, 99, 101 and 102 during this operation, such is immaterial.

The switches 82, 83, 84 and 86 may be omitted if gate means are provided to gate the first, second, third and fourth groups of M strobe pulses to the arrays 18, 19, 21 and 22 respectively for facsimile transmission. Also, the switches 82, 83, 84 and 86 may be replaced by electronic, rather than mechanical switches, where desired.

Figure 4:
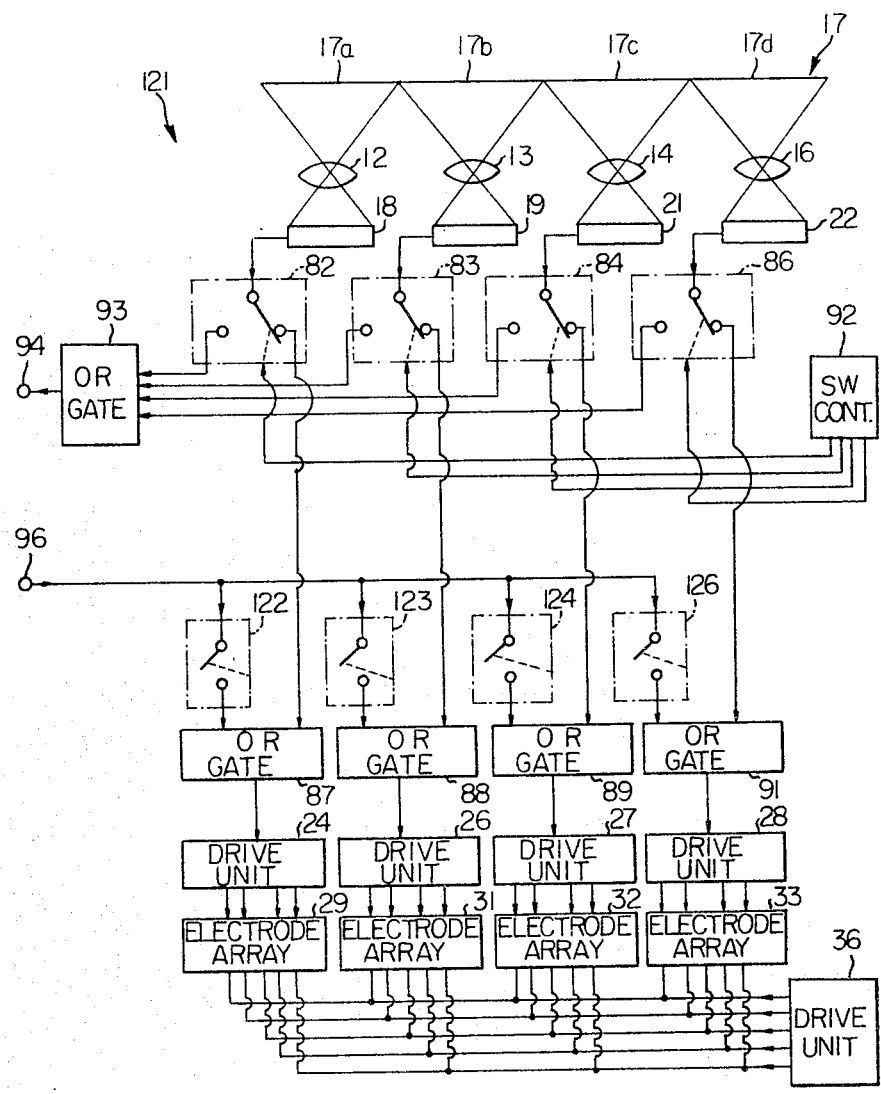
FIG. 4 is similar to FIG. 3 but shows a modified embodiment.

FIG. 4 shows a modified apparatus 121 of the present invention which allows the storage unit 97 to be omitted. In this case, the input terminal 96 is connected to the OR gates 87, 88, 89 and 91 through switches 122, 123, 124 and 126 respectively. The switches 122, 123, 124 and 126 are closed sequentially to pass the first, second, third and fourth groups of M input signals to the OR gates 87, 88, 89 and 91 respectively. In this case, the apparatus 121 prints in the facsimile reception mode at the same speed at which the input signals are received, or N times slower than the apparatus 81. However, the apparatus 121 is directly compatible with a standard facsimile system. Naturally, in the apparatus 81 and 121 the durations, pulse widths, etc. of the clock pulses are adapted to coincide with the facsimile transmission system.

In summary, it will be seen that the present apparatus overcomes the drawbacks of the prior and provides both an electrostatic copying machine and facsimile transceiver in a single unit. The various components of the apparatus are used for both copying and facsimile operations. In addition, the present apparatus increases the speed of electrostatic copying by several times over that possible in the prior art. Various modifications will become possible for those skilled in the art after receiving the teachings of the present disclosure. For example, the apparatus 81 or 121 may be modified so as to comprise a storage means which functions in a manner opposite to the storage unit 97, although not illustrated. This unit would be provided in place of the switches 82, 83, 84 and 86 and OR gate 93 and would function to receive the output signals of the arrays 18, 19, 21 and 22 in parallel and transmit them in series.

What is claimed is:

1. A reproduction apparatus comprising:
   optoelectronic sensor means for scanning a linear portion of an original document, the sensor means comprising N linear photosensor arrays arranged in a row, each photosensor array comprising M photosensor elements, N and M being integers;
   strobe means; and
   printing means for receiving the output signals of all of the photosensor arrays and forming marks on a reproduction medium corresponding thereto, and;
   control means for controlling the strobe means to selectively apply M strobe pulses to all of the N photosensor arrays simultaneously for printing or to apply N groups of M strobe pulses each to the N photosensor arrays respectively in sequence for transmission, the strobe means sequentially applying M strobe pulses to the M photosensor elements respectively in the arrays, the photosensor elements producing output signals in response to the respective strobe pulses.

2. An apparatus as in claim 1, in which the printing means comprises N linear printing electrode arrays arranged in a row, each electrode array comprising M printing electrodes, inputs of the electrode arrays being connected to outputs of the photosensor arrays respectively.

3. An apparatus as in claim 2, in which each electrode array comprises a serial-to-parallel converter having a plurality of outputs, each output being connected to a plurality of printing electrodes, and means for selectively enabling the printing electrodes for printing.

4. An apparatus as in claim 2, in which each electrode array comprises a plurality of serial-to-parallel converters each having a plurality of parallel outputs connected to printing electrodes respectively and data distributor means for feeding groups of output signals to the converters in an alternating manner with respect to time.

5. An apparatus as in claim 2, in which each electrode array comprises R serial-to-parallel converters each having S parallel outputs, each parallel output being connected to P printing electrodes, each printing electrode being connected to only one parallel output, each electrode array further comprising data distributor means for feeding groups of S output signals each to the converters in an alternating manner with respect to time and R gate means connected between the respective converters and printing electrodes for gating output signals to the printing electrode during time periods when output signals are not being applied to the respective converters from the data distributor means, R, S and P being integers, each electrode array further comprising means for consecutively enabling the P printing electrodes connected to each parallel output for printing.

6. An apparatus as in claim 2, further comprising storage means for storing M×N input signals and serially feeding N groups of M input signals each to respective electrode arrays simultaneously.

7. An apparatus as in claim 2, further comprising an input means, N switch means connected between the input means and the electrode arrays respectively and control means for sequentially closing the N switch means for passing N groups of M input signals each to the electrode arrays respectively.

8. A reproduction apparatus comprising:
optoelectronic sensor means for scanning a linear portion of an original document, the sensor means comprising N linear photosensor arrays arranged in a row, each photosensor array comprising M photosensor elements, N and M being integers;
strobe means for sequentially applying M strobe pulses to the M photosensor elements respectively of all of the photosensor arrays, the photosensor elements producing output signals in response to the respective strobe pulses; and
printing means for receiving the output signals of all of the photosensor arrays and forming marks on a reproduction medium corresponding thereto;
the strobe means being adapted to apply N groups of M strobe pulses each to the N photosensor arrays simultaneously for transmission; and
an OR gate means and N switch means connected between outputs of the N photosensor arrays and inputs of the OR gate means respectively and control means for sequentially closing the N switch means for gating N groups of M output signals each from the N photosensor arrays therethrough respectively.

* * * * *